US009749631B2

United States Patent
Lu et al.

(10) Patent No.: US 9,749,631 B2
(45) Date of Patent: *Aug. 29, 2017

(54) METHODS AND APPARATUS FOR DETERMINING QUANTIZATION PARAMETER PREDICTORS FROM A PLURALITY OF NEIGHBORING QUANTIZATION PARAMETERS

(71) Applicant: THOMSON LICENSING, Issy les Moulineaux (FR)

(72) Inventors: Xiaoan Lu, Yardley, PA (US); Joel Sole, La Jolla, CA (US); Peng Yin, Ithaca, NY (US); Qian Xu, Folson, CA (US); Yunfei Zheng, San Jose, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,394

(22) Filed: Dec. 16, 2015

(65) Prior Publication Data

US 2016/0105673 A1  Apr. 14, 2016

Related U.S. Application Data

(63) Continuation of application No. 13/702,519, filed as application No. PCT/US2011/039579 on Jun. 8, 2011, now Pat. No. 9,235,774.
(Continued)

(51) Int. Cl.
*H04N 19/124* (2014.01)
*G06K 9/36* (2006.01)
(Continued)

(52) U.S. Cl.
CPC .............. *H04N 19/124* (2014.11); *G06K 9/36* (2013.01); *G06K 9/481* (2013.01); *H04N 19/126* (2014.11);
(Continued)

(58) Field of Classification Search
CPC ....... H04N 19/00424; H04N 19/00696; H04N 19/00278; H04N 19/124; H04N 19/174;
(Continued)

(56) References Cited

U.S. PATENT DOCUMENTS 8,588,297 B2  11/2013  Kishore et al.
9,235,774 B2  1/2016  Lu et al.
(Continued)

FOREIGN PATENT DOCUMENTS

CN  1767656  5/2006
CN  101502122  8/2009
(Continued)

OTHER PUBLICATIONS

Lee et al; "Improved Loseless Intra Coding for 1-1.264/MPEG-4 AVC" IEEE Transactions on Image Processing, vol. 15, No. 9, Sep. 2006, pp. 2610-2615.
(Continued)

*Primary Examiner* — Amandeep Saini
(74) *Attorney, Agent, or Firm* — Brian J. Dorini; Ronald J. Kolczynski

(57) ABSTRACT

Methods and apparatus are provided for determining quantization parameter predictors from a plurality of neighboring quantization parameters. An apparatus includes an encoder for encoding image data for at least a portion of a picture using a quantization parameter predictor for a current quantization parameter to be applied to the image data. The quantization parameter predictor is determined using multiple quantization parameters from previously coded neigh-
(Continued)

boring portions. A difference between the current quantization parameter and the quantization parameter predictor is encoded for signaling to a corresponding decoder.

8 Claims, 11 Drawing Sheets

Related U.S. Application Data

(60) Provisional application No. 61/353,365, filed on Jun. 10, 2010.

(51) Int. Cl.
*G06K 9/48* (2006.01)
*H04N 19/196* (2014.01)
*H04N 19/51* (2014.01)
*H04N 19/61* (2014.01)
*H04N 19/593* (2014.01)
*H04N 19/126* (2014.01)
*H04N 19/174* (2014.01)
*H04N 19/513* (2014.01)

(52) U.S. Cl.
CPC ......... *H04N 19/174* (2014.11); *H04N 19/196* (2014.11); *H04N 19/197* (2014.11); *H04N 19/51* (2014.11); *H04N 19/513* (2014.11); *H04N 19/593* (2014.11); *H04N 19/61* (2014.11)

(58) Field of Classification Search
CPC .... H04N 19/196; H04N 19/197; H04N 19/51; H04N 19/513; H04N 19/593; H04N 19/61; G06K 9/36; G06K 9/481
USPC ......................................... 382/197
See application file for complete search history.

(56) References Cited

U.S. PATENT DOCUMENTS

| | | | |
|---|---|---|---|
| 2004/0013202 A1 | 1/2004 | Lainema | |
| 2004/0062310 A1 | 4/2004 | Xue et al. | |
| 2006/0209952 A1 | 9/2006 | Tanizawa et al. | |
| 2007/0291849 A1 | 12/2007 | Lainema | |
| 2009/0263036 A1 | 10/2009 | Tanaka | |
| 2009/0296808 A1 | 12/2009 | Regunathan et al. | |
| 2010/0040153 A1 | 2/2010 | Imanaka et al. | |
| 2010/0254620 A1 | 10/2010 | Iwahashi et al. | |
| 2010/0322317 A1 | 12/2010 | Yoshimatsu et al. | |
| 2011/0274162 A1* | 11/2011 | Zhou ................... | H04N 19/176 375/240.03 |
| 2012/0183053 A1 | 7/2012 | Lu et al. | |
| 2014/0321538 A1* | 10/2014 | Sato ................... | H04N 19/176 375/240.03 |

FOREIGN PATENT DOCUMENTS

| | | | | |
|---|---|---|---|---|
| EP | 1995967 A1 | 11/2008 | | |
| EP | 2129134 A1 | 12/2009 | | |
| JP | 2006262004 | 9/2006 | | |
| JP | WO2011049396 | 4/2011 | | |
| JP | 2013-529021 | 7/2013 | | |
| RU | 2350040 | 3/2009 | | |
| WO | WO2008126135 A1 | 10/2008 | | |
| WO | WO 2009105732 A1 * | 8/2009 | ........... | H04N 19/176 |
| WO | WO2009105732 A1 | 8/2009 | | |
| WO | WO2009158113 A2 | 12/2009 | | |
| WO | WO 2009158113 A3 * | 3/2010 | ........... | H04N 19/197 |
| WO | WO2010039728 | 4/2010 | | |
| WO | WO2011064926 | 6/2011 | | |
| WO | WO2011140211 | 11/2011 | | |
| WO | WO2011152518 | 12/2011 | | |

OTHER PUBLICATIONS

Dai et al; "Motion Vector Coding based on Predictor Selection and Boundary-Matching Estimation" Conference Paper, IEEE Xplore, Nov. 2009.
Wan et al; "Efficient Hierarchical Inter Picture Coding for H.264/AVC Baseline Profile" Proceedings PCS'09 3roceedings of the 27th Conference on Picture Coding Symposium, May 6, 2009, p. 301-304.
Laroche et al; "RD Optimized Coding for Motion Vector Predictor Selection" IEEE Transactions on Circuits and Systems for Video Technology, vol. 18, No. 9, Sep. 2008, pp. 1247-1257.
Winken, M. et al., "Description of Video Coding Technology Proposal by Fraunhofer HHI", Joint Collaborative Team on Video Coding (JCT-VC) of ITU-T SG16 WP3 and ISO/IEC JTC1/SC29NVG11, 1st Meeting: Dresden, DE, Apr. 15-23, 2010, JCTVC-A116.
Karczewicz, M. et al, "Video Coding Technology Proposal by Qualcomm Inc.", Joint Collaborative Team on Video Coding (JCT-VC) of ITU-T SG16 WP3 and ISO/IEC JTC1/SC291WG11, 1st Meeting: Dresden, DE, Apr. 15-23, 2010, JCTVC-A121.
McCann K. et al, "Samsung's Response to the Call for Proposals on Video Compression Technology," Joint collaborative Team on Video Coding (JCT-VC) of ITU-T SG16 WP3 and ISO/IEC JTC1/SC29/WG11, 1st Meeting: Dresden, DE, Apr. 15-23, 2010, JCTVC-A124.
Laroche, G. et al, "A Spatio-Temporal Competing Scheme for the Rate-Distortion Optimized Selection and coding of Motion Vectors", Proceedings of the European Signal Processing Conference, Sep. 4, 2006, pp. 1-6.
PCT International Search Report mailed: Aug. 29, 2011.
Huang et al, "A Technical Description of MediaTek's Proposal to the JCT-VC CfP," Joint Collaborative Team on Video Coding (JCT-VC) of ITU-T SG16 WP3 and ISO/IEC JTC1/SC29/WG11, 1st Meeting: Dresden, DE, Apr. 2010, JCTVC-A109_r2, pp. 1-15.
Karczewicz et al, "Rate Distortion Optimized Quantization," Joint Video Team (JVT) of ISO/IEC MPEG & ITU-T VCEG (ISO/IECJTC1/SC29/WG11 and ITU-T SG16 Q.6), 27th Meeting: Geneva, CH, Apr. 2008, JVT-AA026, pp. 1-5.

* cited by examiner

METHODS AND APPARATUS FOR DETERMINING QUANTIZATION PARAMETER PREDICTORS FROM A PLURALITY OF NEIGHBORING QUANTIZATION PARAMETERS

CROSS-REFERENCE TO RELATED APPLICATIONS

This application is a continuing application of U.S. patent application Ser. No. 13/702,519 and also claims the benefit of U.S. Provisional Application Ser. No. 61/353,365, filed Jun. 10, 2010, which is incorporated by reference herein in its entirety.

TECHNICAL FIELD

The present principles relate generally to video encoding and decoding and, more particularly, to methods and apparatus for determining quantization parameter predictors from a plurality of neighboring quantization parameters.

BACKGROUND

Most video applications seek the highest possible perceptual quality for a given set of bit rate constraints. For example, in a low bit rate application such as a videophone system, a video encoder may provide higher quality by eliminating the strong visual artifacts at the regions of interest that are visually more noticeable and therefore more important. On the other hand, in a high bit rate application, visually lossless quality is expected everywhere in the pictures and a video encoder should also achieve transparent quality. One challenge in obtaining transparent visual quality in high bit rate applications is to preserve details, especially at smooth regions where loss of details are more visible than that at the non-smooth regions because of the texture masking property of the human visual system.

Increasing the available bit rate is one of the most straightforward approaches to improving objective and subjective quality. When the bit rate is given, an encoder manipulates its bit allocation module to spend the available bits where the most visual quality improvement can be obtained. In non-real-time applications such as digital video disk (DVD) authoring, the video encoder can facilitate a variable-bit-rate (VBR) design to produce a video with a constant quality on both difficult and easily encoded contents over time. In such applications, the available bits are appropriately distributed over the different video segments to obtain a constant quality. In contrast, a constant-bit-rate (CBR) system assigns the same number of bits to an interval of one or more pictures despite their encoding difficulty and produces visual quality that varies with the video content. For both variable-bit-rate and constant-bit-rate encoding systems, an encoder can allocate bits according to perceptual models within a picture. One characteristic of human perception is texture masking, which explains why human eyes are more sensitive to loss of quality at the smooth regions than in textured regions. This property can be utilized to increase the number of bits allocated to the smooth regions to obtain a higher visual quality.

The quantization process in a video encoder controls the number of encoded bits and the quality. It is common to adjust the quality through adjusting the quantization parameters (QPs). The quantization parameters may include the quantization step size, rounding offset, and scaling matrix. In the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), the quantization parameter values can be adjusted on a slice or macroblock (MB) level. The encoder has the flexibility to tune quantization parameters and signal the adjustment to the decoder. The quantization parameter signaling requires an overhead cost.

QP Coding in the MPEG-4 AVC Standard

The syntax in the MPEG-4 AVC Standard allows quantization parameters to be different for each slice and macroblock (MB). The value of a quantization parameter is an integer and is in the range of 0-51. The initial value for each slice can be derived from the syntax element pic_init_qp_minus26. The initial value is modified at the slice layer when a non-zero value of slice_qp_delta is coded, and is modified further when a non-zero value of mb_qp_delta is coded at the macroblock layer.

Mathematically, the initial quantization parameter for the slice is computed as follows:

$$\text{SliceQP}_Y = 26 + \text{pic\_init\_qp\_minus26} + \text{slice\_qp\_delta}, \quad (1)$$

At the macroblock layer, the value of QP is derived as follows:

$$QP_Y = QP_{Y,PREV} + \text{mb\_qp\_delta}, \quad (2)$$

where $QP_{Y,PREV}$ is the quantization parameter of the previous macroblock in the decoding order in the current slice.

Quantization Parameter Coding in a First Prior Art Approach

In a first prior art approach (as well as a second prior art approach described in further detail herein below), motion partitions larger than 16×16 pixels are implemented. Using the first prior art approach as an example, macroblocks of sizes 64×64, 64×32, 32×64, 32×32, 32×16, and 16×32 are used in addition to the existing MPEG-4 AVC Standard partitioning sizes. Two new syntax elements mb64_delta_qp and mb32_delta_qp are introduced to code the quantization parameters for large blocks.

The first prior art approach permits the luminance quantizer step size to change as follows. If a 64×64 block is partitioned into four separate 32×32 blocks, each 32×32 block can have its own quantization parameter. If a 32×32 block is further partitioned into four 16×16 blocks, each 16×16 block can also have its own quantization parameter. This information is signaled to the decoder using delta_qp syntax. For a 64×64 block, if the mb64_type is not P8×8 (meaning no further partition), mb64_delta_qp is encoded to signal the relative change in luminance quantizer step size with respect to the block on the top-left side of the current block. This block can be of size 64×64, 32×32 or 16×16. The decoded value of mb64_qp_delta is restricted to be in the range [−26, 25]. The mb64_qp_delta value is inferred to be equal to 0 when it is not present for any block (including P_Skip and B_Skip block types). The value of luminance quantization for the current block, $QP_Y$, is derived as follows:

$$QP_Y = (QP_{Y,PREV} + \text{mb64\_qp\_delta} + 52) \% 52, \quad (3)$$

where $QP_{Y,PREV}$ is the luminance QP of the previous 64×64 block in the decoding order in the current slice. For the first 64×64 block in the slice, $QP_{Y,PREV}$ is set equal to the slice quantization parameter sent in the slice header.

If mb64_type is P8×8 (meaning a 64×64 block is portioned into four 32×32 blocks), then for each 32×32 block, the same process is repeated. That is, if mb32_type is not P8×8 (meaning no further partition), mb32_delta_qp is encoded. Otherwise, delta_qp for each 16×16 macroblock is sent to the decoder as in the MPEG-4 AVC Standard. It should be noted that when delta_qp is signaled at the 64×64 or 32×32 block size, it is applicable to all the blocks in the motion partition.

Quantization Parameter Coding in a Second Prior Art Approach

In the second prior art approach, the large blocks are supported through the concept of a coding unit. In the second prior art approach, a coding unit (CU) is defined as a basic unit which has a square shape. Although it has a similar role to the macroblock and sub-macroblock in the MPEG-4 AVC Standard, the main difference lies in the fact that the coding unit can have various sizes, with no distinction corresponding to its size. All processing except frame-based loop filtering is performed on a coding unit basis, including intra/inter prediction, transform, quantization and entropy coding. Two special terms are defined: the largest coding unit (LCU); and the smallest coding unit (SCU). For convenient implementation, LCU size and SCU size are limited to values which are a power of 2 and which are greater than or equal to 8.

It is assumed that a picture consists of non-overlapped LCUs. Since the coding unit is restricted to be a square shape, the coding unit structure within a LCU can be expressed in a recursive tree representation adapted to the picture. That is, the coding unit is characterized by the largest coding unit size and the hierarchical depth in the largest coding unit that the coding unit belongs to.

Coupled with the coding unit, the second prior art approach introduces a basic unit for the prediction mode: the prediction unit (PU). It should be noted that the prediction unit is defined only for the last-depth coding unit and its size is limited to that of the coding unit. Similar to conventional standards, two different terms are defined to specify the prediction method: the prediction type; and the prediction unit splitting. The prediction type is one of the values among skip, intra or inter, which roughly describe the nature of the prediction method. After that, possible prediction unit splittings are defined according to the prediction type. For a coding unit size of 2N×2N, the prediction unit for intra has two different possible splittings: 2N×2N (i.e., no split); and N×N (i.e., a quarter split). The prediction unit for inter has eight different possible splittings: four symmetric splittings (2N×2N, 2N×N, N×2N, N×N) and four asymmetric splittings (2N×nU, 2N×nD, nL×2N and nR×2N).

In addition to the coding unit and prediction unit definitions, a transform unit (TU) for transform and quantization is defined separately. It should be noted that the size of the transform unit may be larger than that of the prediction unit, which is different from previous video standards, but the transform unit may not exceed the coding unit size. However, the transform unit size is not arbitrary and once a prediction unit structure has been defined for a coding unit, only two transform unit partitions are possible. As a result, the size of the transform unit in the coding unit is determined by the transform_unit_size_flag. If the transform_unit_size_flag is set to 0, the size of the transform unit is the same as that of the coding unit to which the transform unit belongs. Otherwise, the transform unit size is set as N×N or N/2×N/2 according to the prediction unit splitting.

The basic principle for the quantization and de-quantization coefficients for large transforms is the same as that used in the MPEG-4 AVC Standard, i.e., a scalar quantizer with a dead-zone. Exactly the same quantization parameter range and corresponding quantization step have been used in the proposed codec. For each coding unit, the proposal permits the quantization parameter to change. The value of luminance quantization for the current block, $QP_Y$, is derived as follows:

$$QP_Y = SliceQP_Y + qp\_delta, \quad (4)$$

where $SliceQP_Y$ is the quantization parameter for the slice, and qp_delta is the difference between the quantization parameter for the current coding unit and the slice. The same quantization parameter is applied to the whole coding unit.

Typical QP Coding Process-QP Predictor from a Single QP

Turning to FIG. 1, a conventional quantization parameter encoding process in a video encoder is indicated generally by the reference numeral 100. The method 100 includes a start block 105 that passes control to a function block 110. The function block 110 sets a quantization parameter (QP) for a slice to $SliceQP_Y$, stores $SliceQP_Y$ as the QP predictor, and passes control to a loop limit block 115. The loop limit block 115 begins a loop using a variable i having a range from 1, . . . , number (#) of coding units, and passes control to a function block 120. The function block 120 sets the QP for each coding unit to $QP_{CU}$, and passes control to a function block 125. The function block 125 encodes delta_QP=$QP_{CU}$−$SliceQP_Y$, and passes control to a function block 130. The function block 130 encodes coding unit i, and passes control to a loop limit block 135. The loop limit block 135 ends the loop over the coding units, and passes control to an end block 199.

Thus, in method 100, a single QP, namely the slice QP ($SliceQP_Y$), is used as the predictor for the QP to be encoded. Regarding function block 120, the QP for a coding unit is adjusted based on its content and/or the previous encoding results. For example, a smooth coding unit will lower the QP to improve the perceptual quality. In another example, if the previous coding units use more bits than the assigned ones, then the current coding unit will increase the QP to consume fewer bits than what is originally assigned. The difference between the QP for the current coding unit ($QP_{CU}$) and the QP predictor, $SliceQP_Y$, in this example, is encoded (per function block 125).

Turning to FIG. 2, a conventional quantization parameter decoding process in a video decoder is indicated generally by the reference numeral 200. The method 200 includes a start block 205 that passes control to a function block 210. The function block 210 decodes $SliceQP_Y$, stores $SliceQP_Y$ as the QP predictor, and passes control to a loop limit block 215. The loop limit block 215 begins a loop using a variable i having a range from 1, . . . , number (#) of coding units, and passes control to a function block 220. The function block 220 decodes delta_QP, and passes control to a function block 225. The function block 225 sets the QP for each coding unit to $QP_{CU}$=$SliceQP_Y$+delta_QP, and passes control to a function block 230. The function block 230 decodes coding unit i, and passes control to a loop limit block 235. The loop limit block 235 ends the loop over the coding units, and passes control to an end block 299. Regarding function block 230, the coding unit is reconstructed thereby.

SUMMARY

These and other drawbacks and disadvantages of the prior art are addressed by the present principles, which are directed to methods and apparatus for determining quantization parameter predictors from a plurality of neighboring quantization parameters.

According to an aspect of the present principles, there is provided an apparatus. The apparatus includes an encoder for encoding image data for at least a portion of a picture using a quantization parameter predictor for a current quantization parameter to be applied to the image data. The quantization parameter predictor is determined using multiple quantization parameters from previously coded neighboring portions. A difference between the current quantization parameter and the quantization parameter predictor is encoded for signaling to a corresponding decoder.

According to another aspect of the present principles, there is provided a method in a video encoder. The method includes encoding image data for at least a portion of a picture using a quantization parameter predictor for a current quantization parameter to be applied to the image data. The quantization parameter predictor is determined using multiple quantization parameters from previously coded neighboring portions. The method further includes encoding a difference between the current quantization parameter and the quantization parameter predictor for signaling to a corresponding decoder.

According to still another aspect of the present principles, there is provided an apparatus. The apparatus includes a decoder for decoding image data for at least a portion of a picture using a quantization parameter predictor for a current quantization parameter to be applied to the image data. The quantization parameter predictor is determined using multiple quantization parameters from previously coded neighboring portions. A difference between the current quantization parameter and the quantization parameter predictor is decoded for use in decoding the image data.

According to yet another aspect of the present principles, there is provided a method in a video decoder. The method includes decoding image data for at least a portion of a picture using a quantization parameter predictor for a current quantization parameter to be applied to the image data. The quantization parameter predictor is determined using multiple quantization parameters from previously coded neighboring portions. The method further includes decoding a difference between the current quantization parameter and the quantization parameter predictor for use in decoding the image data.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
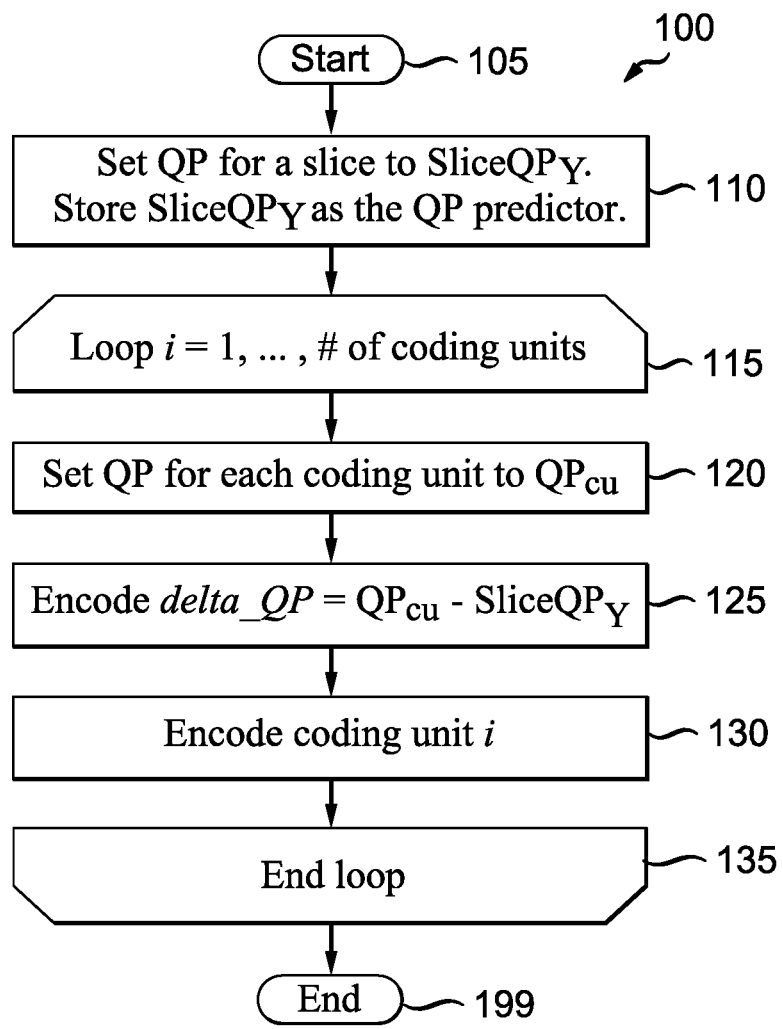
FIG. 1 is a flow diagram showing a conventional quantization parameter encoding process in a video encoder, in accordance with the prior art.
Figure 2:
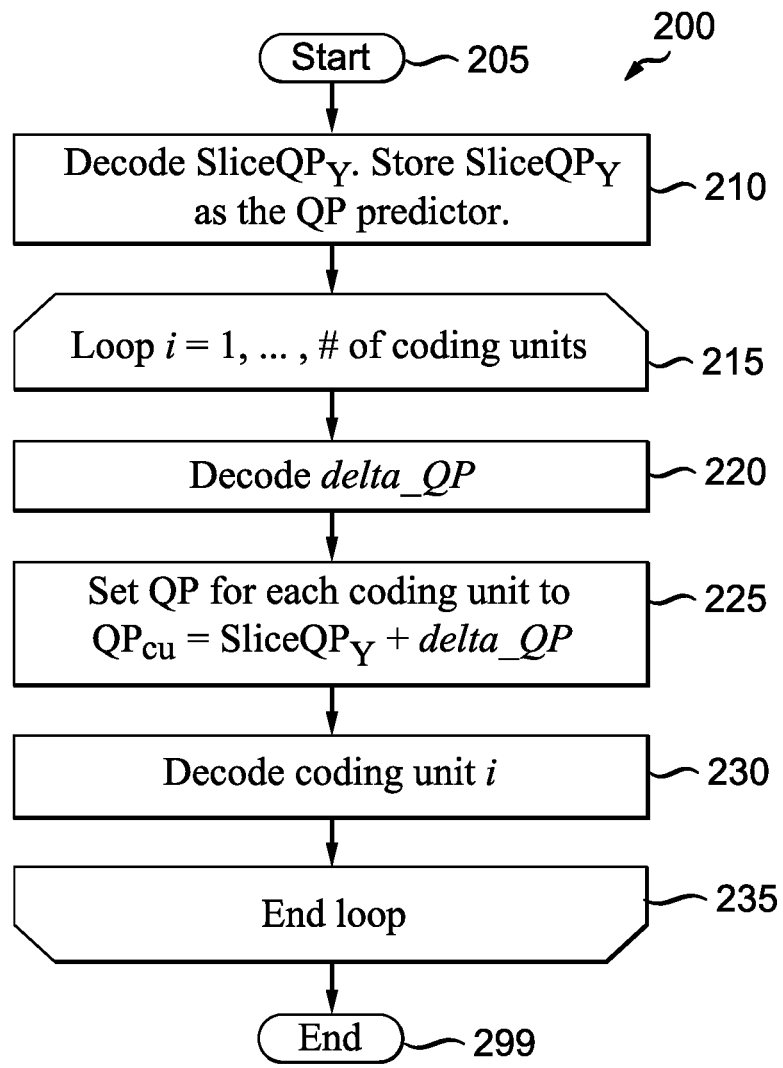
FIG. 2 is a flow diagram showing a conventional quantization parameter decoding process in a video decoder, in accordance with the prior art.

The present principles are directed to methods and apparatus for determining quantization parameter predictors from a plurality of neighboring quantization parameters.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Moreover, as used herein, the phrase "coding unit" (CU) refers to a basic unit which has a square shape. Although it has a similar role to the macroblock and sub-macroblock in the MPEG-4 AVC Standard, the main difference lies in the fact that the coding unit can have various sizes, with no distinction corresponding to its size. All processing except frame-based loop filtering is performed on a coding unit basis, including intra/inter prediction, transform, quantization and entropy coding.

Further, as used herein, the phrase "prediction unit" (PU) refers to a basic unit for the prediction mode. It should be noted that the PU is only defined for the last-depth CU and its size is limited to that of the CU. All information related to prediction is signaled on a PU basis.

Also, as used herein, the phrase "transform unit" (TU) refers to a basic unit for the transform. It should be noted that the size of the transform unit may be larger than that of the prediction unit, which is different from previous video standards, but the transform unit may not exceed the coding unit size. However, the transform unit size is not arbitrary and once a prediction unit structure has been defined for a coding unit, only two transform unit partitions are possible. As a result, the size of the transform unit in the coding unit is determined by the transform_unit_size_flag. If the transform_unit_size_flag is set to 0, the size of the transform unit is the same as that of the coding unit to which the transform unit belongs. Otherwise, the transform unit size is set as N×N or N/2×N/2 according to the prediction unit splitting.

Additionally, as used herein, the phrase "skip mode" refers to a prediction mode where the motion information is inferred from the motion vector predictor, and neither motion nor texture information are sent.

Moreover, it is to be appreciated that for purposes of simplicity and clarity of description, we start with the basics defined by the second prior art approach and define new variables, principles, syntax, and so forth as modifications to the second prior art approach. However, it would be apparent to those skilled in the art that the principles and concepts disclosed and described herein in conjunction with the present invention would be applicable to any new or modified standard or proprietary system—and is in no way tied solely to a modification of the second prior art approach. Neither is it tied to the first prior art approach, the MPEG-4 AVC Standard, or any other approach or standard.

Figure 3:
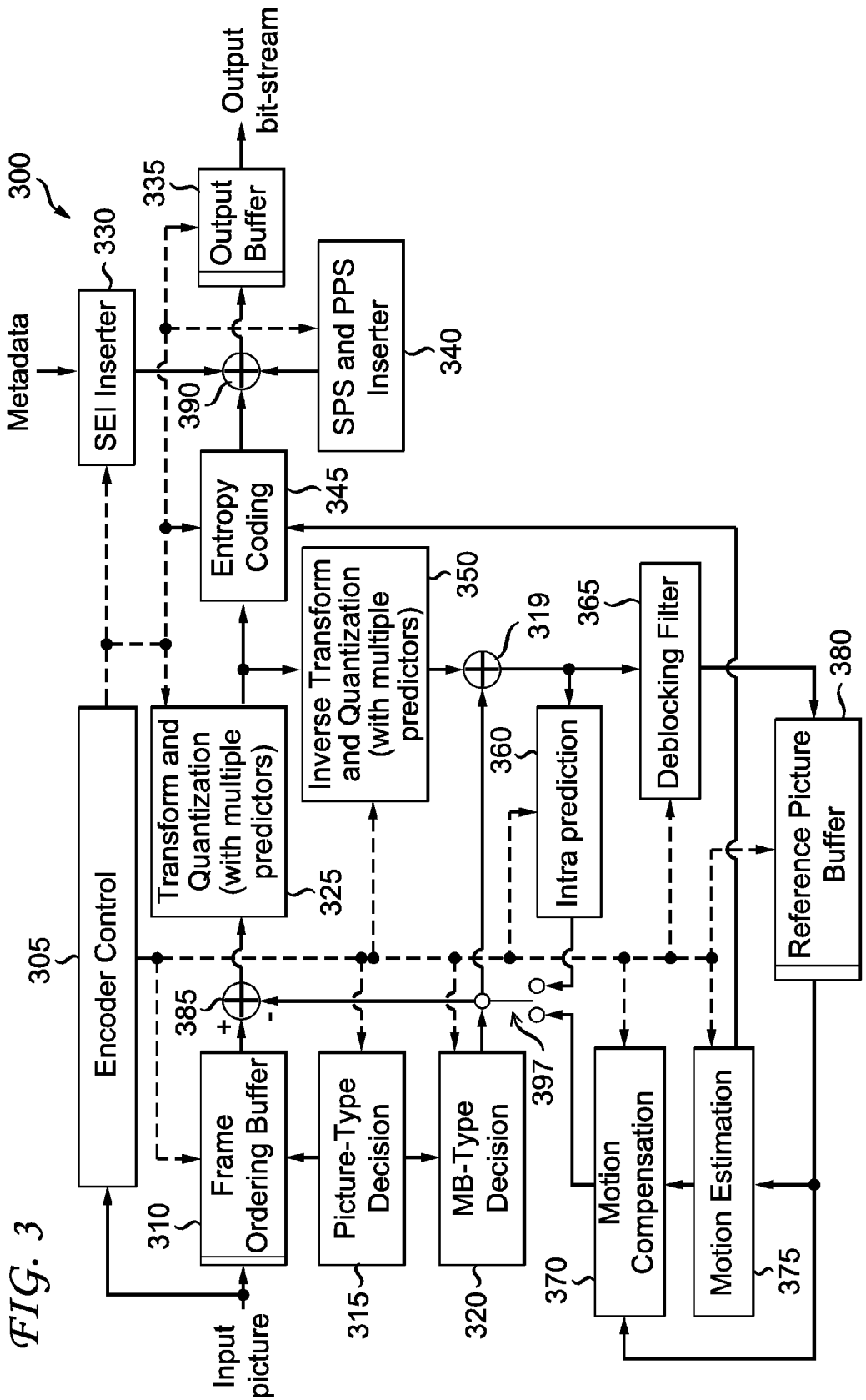
FIG. 3 is a block diagram showing an exemplary video encoder to which the present principles may be applied, in accordance with an embodiment of the present principles.

Turning to FIG. 3, an exemplary video encoder to which the present principles may be applied is indicated generally by the reference numeral 300. The video encoder 300 includes a frame ordering buffer 310 having an output in signal communication with a non-inverting input of a combiner 385. An output of the combiner 385 is connected in signal communication with a first input of a transformer and quantizer (with multiple predictors) 325. An output of the transformer and quantizer (with multiple predictors) 325 is connected in signal communication with a first input of an entropy coder 345 and a first input of an inverse transformer and inverse quantizer (with multiple predictors) 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer (with multiple predictors) 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer (with multiple predictors) 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer (with multiple predictors) 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 100, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
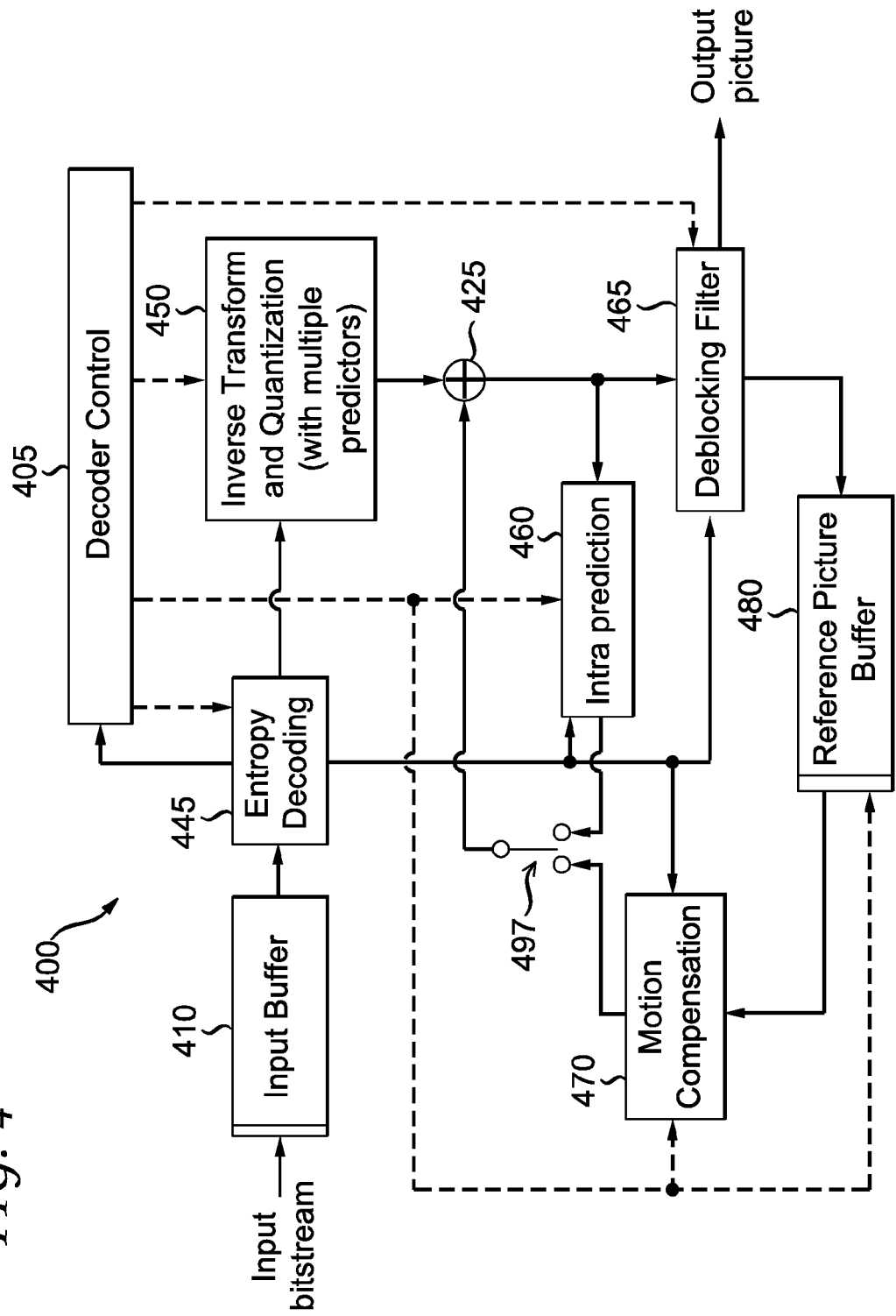
FIG. 4 is a block diagram showing an exemplary video decoder to which the present principles may be applied, in accordance with an embodiment of the present principles.

Turning to FIG. 4, an exemplary video decoder to which the present principles may be applied is indicated generally by the reference numeral 400. The video decoder 400 includes an input buffer 410 having an output connected in signal communication with a first input of an entropy decoder 445. A first output of the entropy decoder 445 is connected in signal communication with a first input of an inverse transformer and inverse quantizer (with multiple predictors) 450. An output of the inverse transformer and inverse quantizer (with multiple predictors) 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer (with multiple predictors) 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus for determining quantization parameter predictors from a plurality of neighboring quantization parameters.

Regarding the aforementioned first and second prior art approaches, we note that the same support adjusting quantization parameters on a block level, where the block can be a macroblock, a large block (as in the first prior art approach), or a coding unit (as in the second prior art approach). The quantization parameter values are differentially coded. In the MPEG-4 AVC Standard and in the first prior art approach, the quantization parameter of the previous block in the coding order in the current slice is used as the predictor. In the second prior art approach, the slice quantization parameter is used as the predictor.

In accordance with the present principles, we provide methods and apparatus for determining the quantization parameter predictor using multiple quantization parameters of the neighboring coded blocks. The quantization parameter predictor calculation is defined by a rule, which is known to both the encoder and decoder. One benefit of this scheme over prior schemes is the reduction of overhead needed for signaling quantization parameters to the decoder.

The quantization parameter is often adjusted to meet the target bit rate or adapt to the content to improve the visual quality. This causes QP variations among the coding units. For purposes of description of the present principles, the word coding unit(s) is meant to include a broad spectrum of image partitions and regions including, but not limited to blocks, macroblocks, superblocks, supermacroblocks, sub-macroblocks, sub blocks, image partitions, image geometric partitions, image regions, prediction unit, and transform unit. To reduce the overhead cost in signaling the QP difference, we disclose and describe methods and apparatus to improve the QP predictor performance. The QP predictor is formed by multiple QPs from neighboring blocks of previously encoded/decoded coding units, using the same method at both the encoder and decoder, thereby reducing the signaling overhead required.

Figure 5:
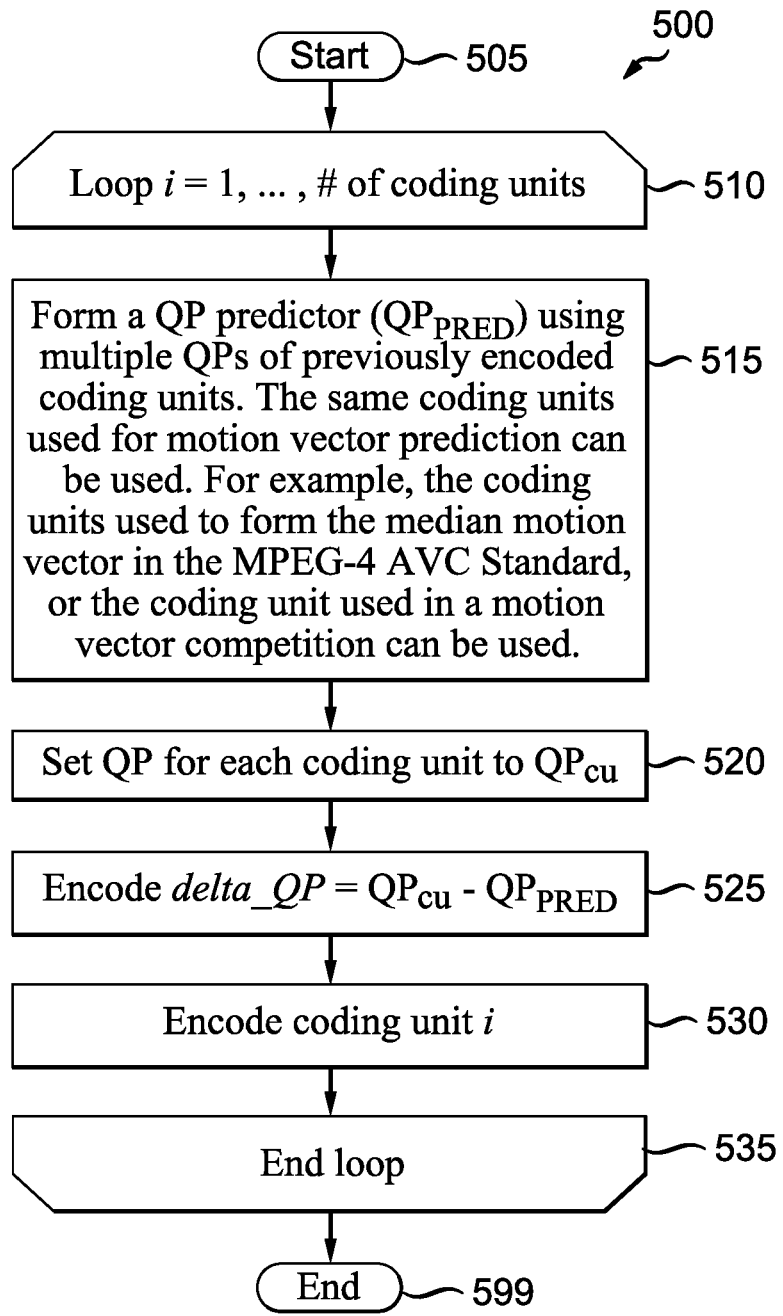
FIG. 5 is a flow diagram showing an exemplary quantization parameter encoding process in a video encoder, in accordance with an embodiment of the present principles.

Turning to FIG. 5, an exemplary quantization parameter encoding process in a video encoder is indicated generally by the reference numeral 500. The method 500 includes a start block 505 that passes control to a loop limit block 510. The loop limit block 510 begins a loop using a variable i having a range from 1, ..., number (#) of coding units, and passes control to a function block 515. The function block 515 forms a QP predictor ($QP_{PRED}$) using multiple QPs of previously encoded coding units, and passes control to a function block 520. The function block 520 sets the QP for each coding unit to $QP_{CU}$, and passes control to a function block 525. The function block 525 encodes delta_QP= $QP_{CU}-QP_{PRED}$, and passes control to a function block 530. The function block 530 encodes coding unit i, and passes control to a loop limit block 535. The loop limit block 535 ends the loop over the coding units, and passes control to an end block 599. Regarding function block 515, the same coding units used for motion vector prediction can be used to form the predictor $QP_{PRED}$. For example, the coding units used to form the median motion vector in the MPEG-4 AVC Standard, or the coding unit used in a motion vector competition can be used.

Figure 6:
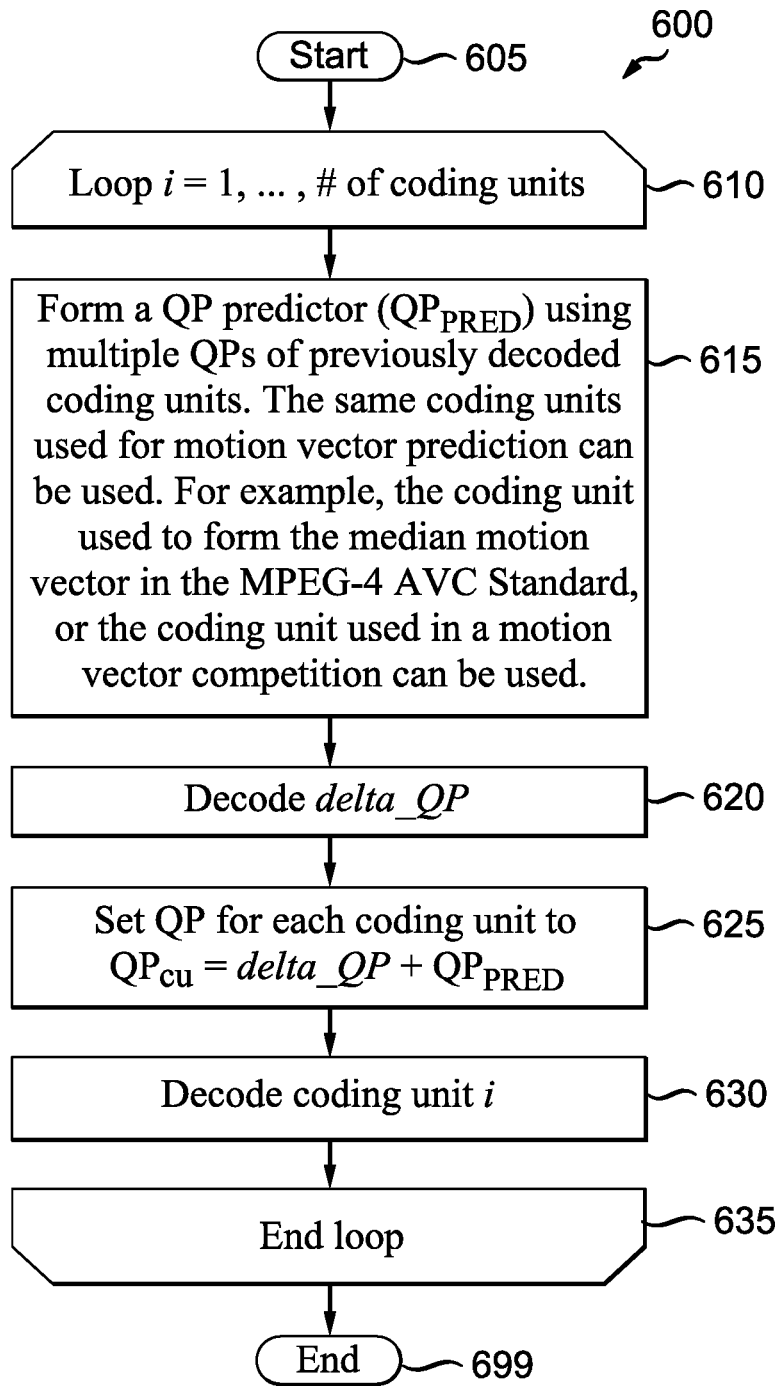
FIG. 6 is a flow diagram showing an exemplary quantization parameter decoding process in a video decoder, in accordance with an embodiment of the present principles.

Turning to FIG. 6, an exemplary quantization parameter decoding process in a video decoder is indicated generally by the reference numeral 600. The method 600 includes a start block 605 that passes control to a loop limit block 610. The loop limit block 610 begins a loop using a variable i having a range from 1, ..., number (#) of coding units, and passes control to a function block 615. The function block 615 forms a QP predictor ($QP_{PRED}$) using multiple QPs of previously decoded coding units, and passes control to a function block 620. The function block 620 decodes delta_QP, and passes control to a function block 625. The function block 625 sets the QP for each coding unit to $QP_{CU}$=delta_QP+$QP_{PRED}$, and passes control to a function block 630. The function block 630 decodes coding unit i, and passes control to a loop limit block 635. The loop limit block 635 ends the loop over the coding units, and passes control to an end block 699. Regarding function block 615, the same coding units used for motion vector prediction can be used to form the predictor $QP_{PRED}$. For example, the coding units used to form the median motion vector in the MPEG-4 AVC Standard, or the coding unit used in a motion vector competition can be used.

QP Predictor ($QP_{PRED}$) Derivation

In the following, we disclose and describe a scheme to form the QP predictor. The same methodology is used at both the encoder and decoder for synchrony.

Figure 7:
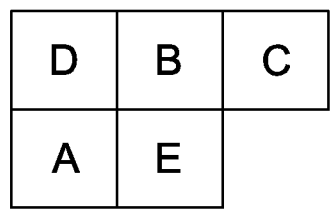
FIG. 7 is a diagram showing exemplary neighboring coding units, in accordance with an embodiment of the present principles.

Providing high perceptual quality at the region of interest has a pronounced impact in the overall perceptual quality. Hence a general guideline in the QP adjustment is to assign lower QPs to the regions of interest to improve the perceptual quality and higher QPs to other areas to reduce the number of bits. Since the picture content has great continuity, the QPs for neighboring coding units are often correlated. In the prior art, the correlation between the current QP and the QP of the previously coded block is exploited. Since the QP can also correlate to QPs from other neighboring blocks, we improve the QP predictor by considering more QPs. Turning to FIG. 7, exemplary neighboring coding units are indicated generally by the reference numeral 700. The neighboring coding units 700 include the following: left neighboring coding unit indicated by A; top neighboring coding unit indicated by B; top-right neighboring coding unit indicated by C; and top-left neighboring coding unit indicated by D). Neighboring coding units A through D are used to form a QP predictor for the current coding unit indicated by E. In one example, the definitions of A, B, C, and D are the same as the blocks used for the MPEG-4 AVC Standard motion vector predictors. More QPs from other neighboring coding units can also be included to obtain the QP predictor.

The QP predictor will be formed according to a rule that is known to both the encoder and decoder. Using the QP at coding unit A, B, and C, we provide a few exemplary rules as follows:

Rule 1: $QP_{PRED}$=median($QP_A$, $QP_B$, $QP_C$);
Rule 2: $QP_{PRED}$=min($QP_A$, $QP_B$, $QP_C$);
Rule 3: $QP_{PRED}$=max($QP_A$, $QP_B$, $QP_C$);
Rule 4: $QP_{PRED}$=mean($QP_A$, $QP_B$, $QP_C$) or $QP_{PRED}$= mean($QP_A$, $QP_B$);

If not all the coding units (A, B, C) are available, we can replace their QPs with the $SliceQP_Y$, or only use the available QPs to form the predictor. For example, when coding unit A is unavailable, Rule 2 becomes $QP_{PRED}$=min($QP_B$, $QP_C$). In another example, when not all coding units are available, we can replace the missing QPs with QPs of other blocks, for example using block D to replace block C.

Motion vector prediction in the MPEG-4 AVC Standard shares a similar philosophy of generating the motion vector predictor using the median vector of its neighboring motion vectors. The difference between the motion vector and the motion vector predictor is encoded and sent in the bitstream. To unify the prediction processes for both motion vector and QP, one embodiment is to use the same neighboring coding units to predict both the motion vector and QP when a block is coded in the INTER mode.

The VCEG "key technical area" (KTA) software (KTA software Version KTA2.6) has provided a common platform to integrate the new advances in video coding after the MPEG-4 AVC Standard is finalized. The proposal of using a motion vector competition was adopted into KTA. In the motion vector competition scheme, a coding block has a set of motion vector predictor candidates that include motion vectors of spatially or temporally neighboring blocks. The best motion vector predictor is selected from the candidate set based on rate-distortion optimization. The index of the motion vector predictor in the set is explicitly transmitted to the decoder if the set has more than one candidate. To unify the prediction processes for both motion vector and QP, one embodiment involves using the same neighboring coding units to predict both the motion vector and QP when a block is coded in the INTER mode. Since the index of the motion vector predictor is already sent for the motion vector competition, no extra overhead is necessary for the QP predictor.

Variation 1 Embodiment—QP Adjustment at Prediction Unit

The coding unit can be as large as 128×128. This translates into very few coding units in a picture. To meet the target bit rate accurately, the QP variation between the coding units may be large. One solution to smooth the QP variation is to apply the QP adjustment at the prediction unit instead of the coding unit. We only need to send the QP difference when the prediction unit is not in a skip mode.

Figure 8:
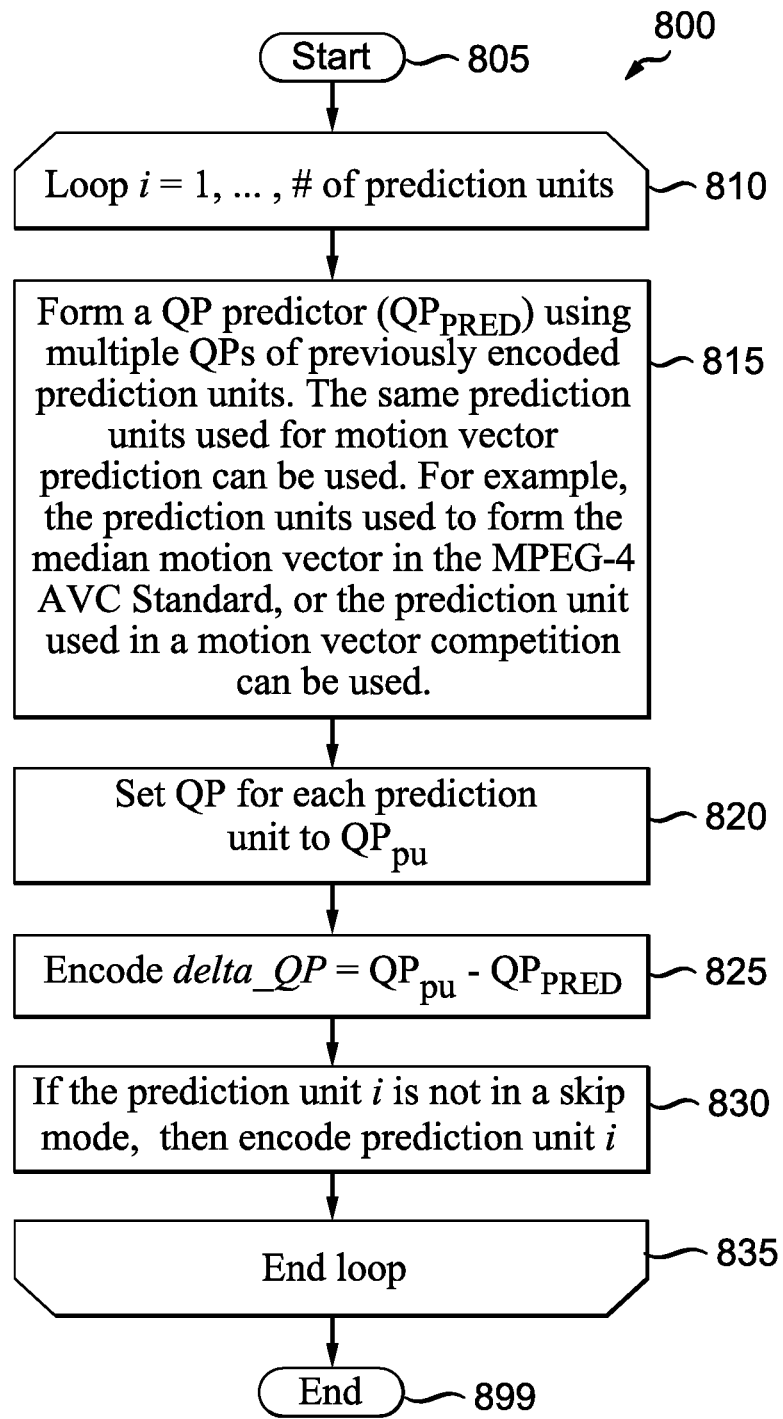
FIG. 8 is a flow diagram showing another exemplary quantization parameter encoding process in a video encoder, in accordance with an embodiment of the present principles.

Turning to FIG. 8, another exemplary quantization parameter encoding process in a video encoder is indicated generally by the reference numeral 800. It is to be appreciated that the method 800 involves QP adjustment at the prediction unit. The method 800 includes a start block 805 that passes control to a loop limit block 810. The loop limit block 810 begins a loop using a variable i having a range from 1, ..., number (#) of prediction units, and passes control to a function block 815. The function block 815 forms a QP predictor ($QP_{PRED}$) using multiple QPs of previously encoded prediction units, and passes control to a function block 820. The function block 820 sets the QP for each prediction unit to $QP_{PU}$, and passes control to a function block 825. The function block 825 encodes delta_QP=$QP_{PU}$-$QP_{PRED}$, and passes control to a function block 830. The function block 830 encodes prediction unit i if prediction unit i is not in a skip mode, and passes control to a loop limit block 835. The loop limit block 835 ends the loop over the prediction units, and passes control to an end block 899. Regarding function block 815, the same prediction units used for motion vector prediction can be used to form the predictor $QP_{PRED}$. For example, the prediction units used to form the median motion vector in the MPEG-4 AVC Standard, or the prediction unit used in a motion vector competition can be used.

Figure 9:
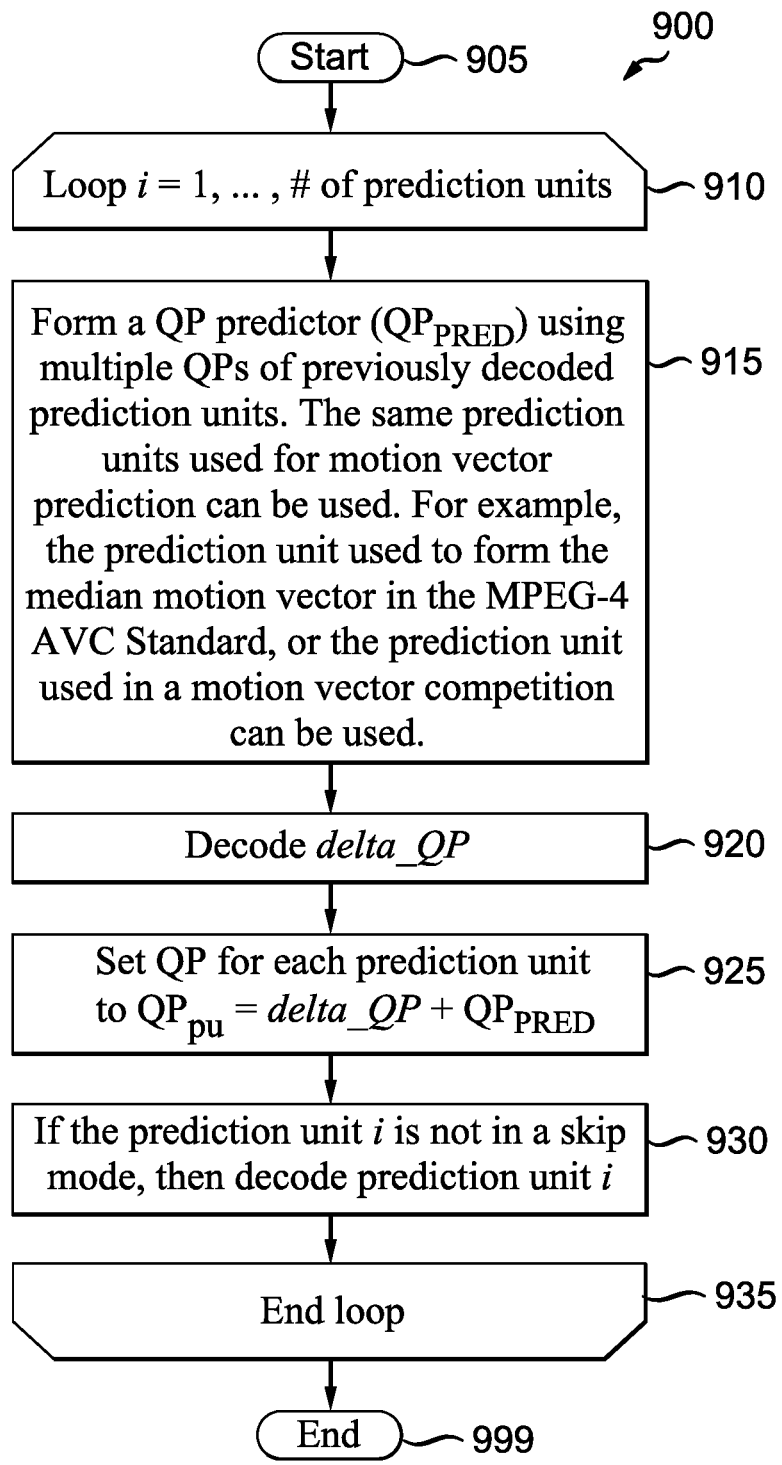
FIG. 9 is a flow diagram showing another exemplary quantization parameter decoding process in a video decoder, in accordance with an embodiment of the present principles.

Turning to FIG. 9, another exemplary quantization parameter decoding process in a video decoder is indicated generally by the reference numeral 900. It is to be appreciated that the method 900 involves QP adjustment at the prediction unit. The method 900 includes a start block 905 that passes control to a loop limit block 910. The loop limit block 910 begins a loop using a variable i having a range from 1, . . . , number (#) of prediction units, and passes control to a function block 915. The function block 915 forms a QP predictor ($QP_{PRED}$) using multiple QPs of previously decoded prediction units, and passes control to a function block 920. The function block 920 decodes delta_QP, and passes control to a function block 925. The function block 925 sets the QP for each prediction unit to $QP_{PU}$=delta_QP+$QP_{PRED}$, and passes control to a function block 930. The function block 930 decodes prediction unit i if prediction unit i is not in a skip mode, and passes control to a loop limit block 935. The loop limit block 935 ends the loop over the prediction units, and passes control to an end block 999. Regarding function block 915, the same prediction units used for motion vector prediction can be used to form the predictor $QP_{PRED}$. For example, the prediction units used to form the median motion vector in the MPEG-4 AVC Standard, or the prediction unit used in a motion vector competition can be used.

Variation 2 Embodiment—QP Adjustment at Transform Unit

Similarly to variation 1, we can apply the QP adjustment at the transform unit. We only need to send the QP difference when there are non-zero transform coefficients in the transform unit.

Figure 10:
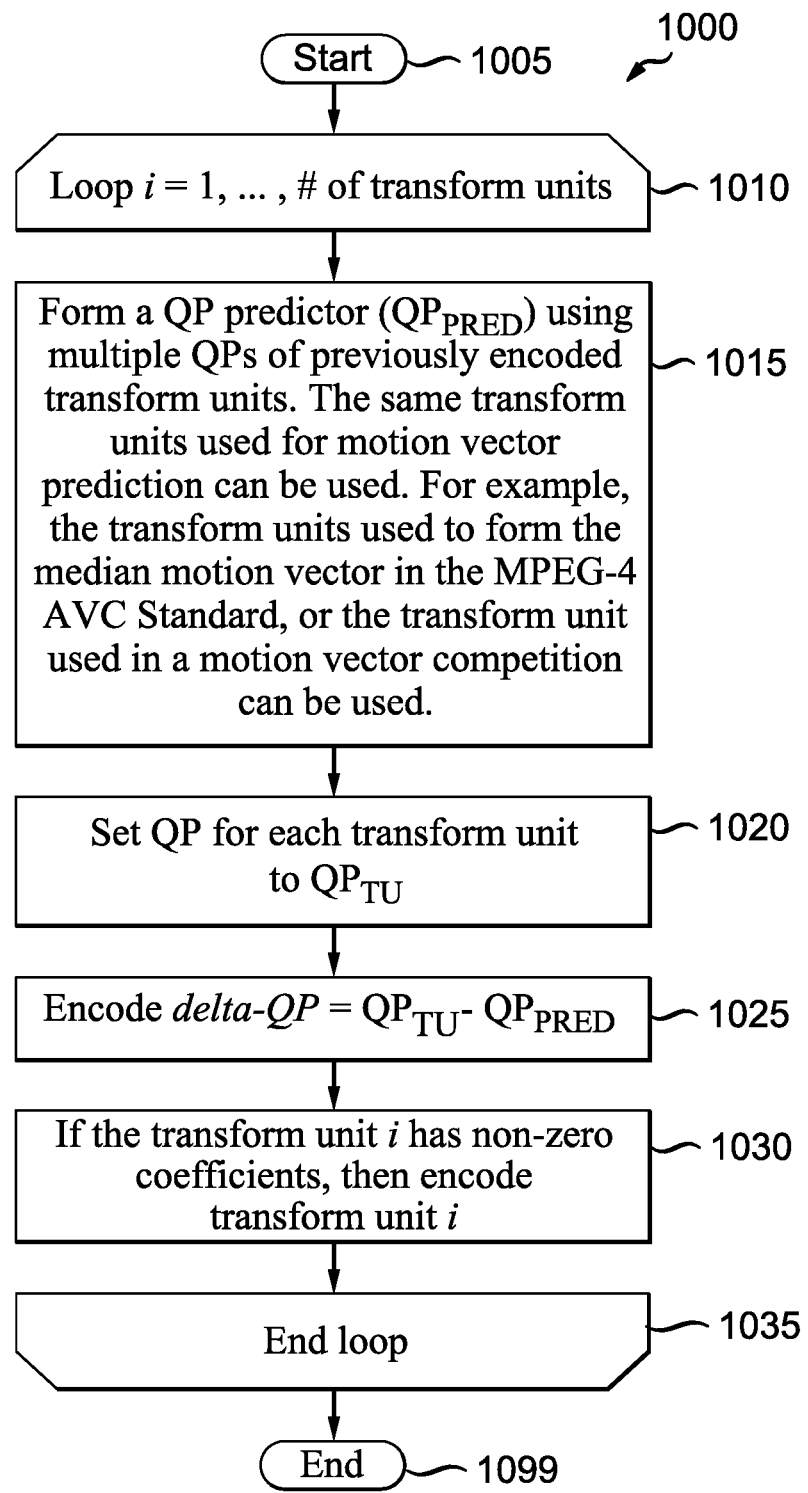
FIG. 10 is a flow diagram showing yet another exemplary quantization parameter encoding process in a video encoder, in accordance with an embodiment of the present principles, in accordance with an embodiment of the present principles.

Turning to FIG. 10, yet another exemplary quantization parameter encoding process in a video encoder is indicated generally by the reference numeral 1000. It is to be appreciated that the method 1000 involves QP adjustment at the transform unit. The method 1000 includes a start block 1005 that passes control to a loop limit block 1010. The loop limit block 1010 begins a loop using a variable i having a range from 1, . . . , number (#) of transform units, and passes control to a function block 1015. The function block 1015 forms a QP predictor ($QP_{PRED}$) using multiple QPs of previously encoded transform units, and passes control to a function block 1020. The function block 1020 sets the QP for each transform unit to $QP_{TU}$, and passes control to a function block 1025. The function block 1025 encodes delta_QP=$QP_{TU}$-$QP_{PRED}$, and passes control to a function block 1030. The function block 1030 encodes transform unit i if transform unit i has non-zero coefficients, and passes control to a loop limit block 1035. The loop limit block 1035 ends the loop over the transform units, and passes control to an end block 1099. Regarding function block 1015, the same transform units used for motion vector prediction can be used to form the predictor $QP_{PRED}$. For example, the transform units used to form the median motion vector in the MPEG-4 AVC Standard, or the transform unit used in a motion vector competition can be used.

Figure 11:
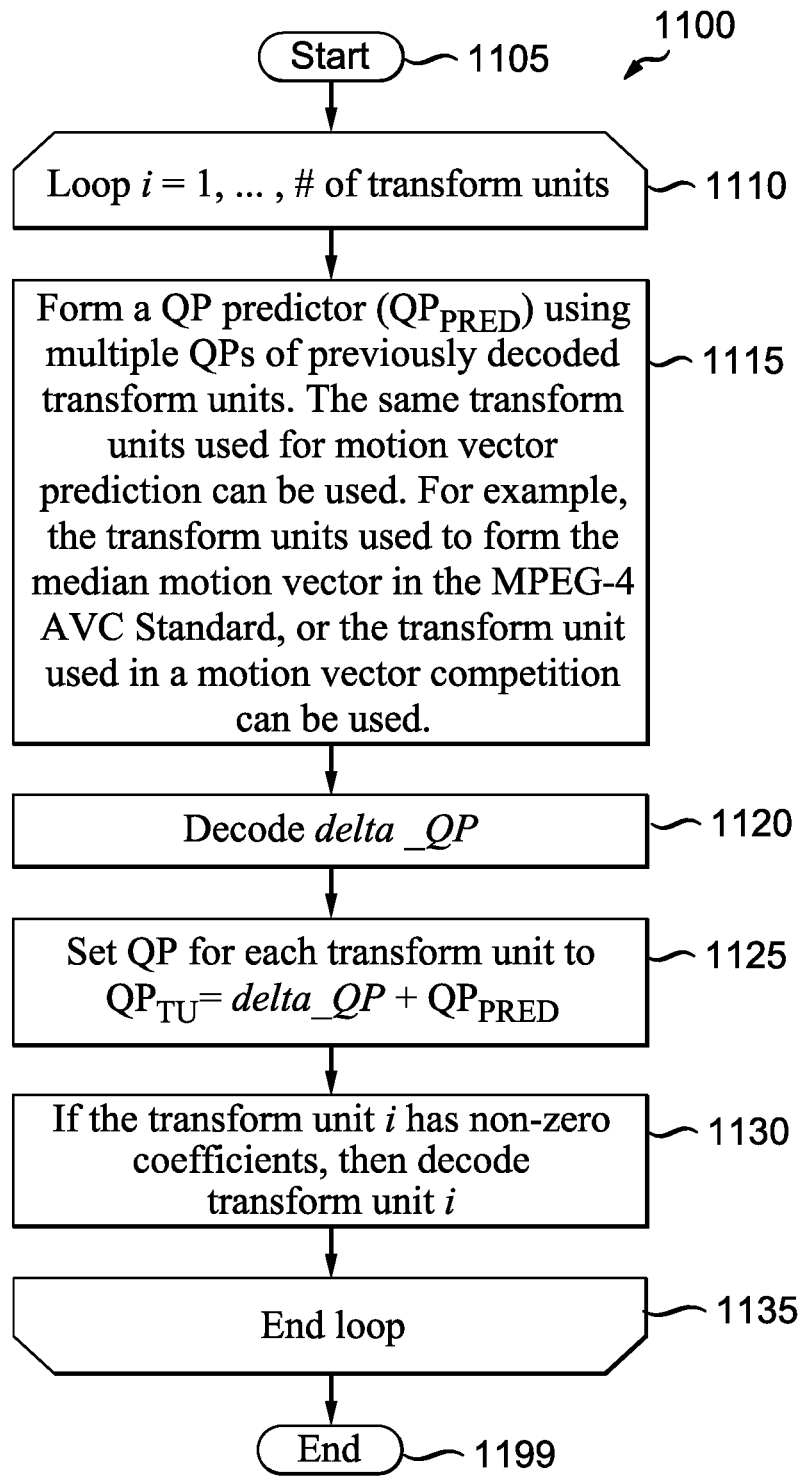
FIG. 11 is a flow diagram showing yet another exemplary quantization parameter decoding process in a video decoder, in accordance with an embodiment of the present principles.

Turning to FIG. 11, yet another exemplary quantization parameter decoding process in a video decoder is indicated generally by the reference numeral 1100. It is to be appreciated that the method 1100 involves QP adjustment at the transform unit. The method 1100 includes a start block 1105 that passes control to a loop limit block 1110. The loop limit block 1110 begins a loop using a variable i having a range from 1, . . . , number (#) of transform units, and passes control to a function block 1115. The function block 1115 forms a QP predictor ($QP_{PRED}$) using multiple QPs of previously decoded transform units, and passes control to a function block 1120. The function block 1120 decodes delta_QP, and passes control to a function block 1125. The function block 1125 sets the QP for each transform unit to $QP_{TU}$=delta_QP+$QP_{PRED}$, and passes control to a function block 1130. The function block 1130 decodes transform unit i if transform unit i has non-zero coefficients, and passes control to a loop limit block 1135. The loop limit block 1135 ends the loop over the transform units, and passes control to an end block 1199. Regarding function block 1115, the same transform units used for motion vector prediction can be used to form the predictor $QP_{PRED}$. For example, the transform units used to form the median motion vector in the MPEG-4 AVC Standard, or the transform unit used in a motion vector competition can be used.

Syntax

Using the QP adjustment at the transform unit as an example, we describe how to design the syntax to apply to the present principles. A syntax element TU_delta_QP is used to specify the QP difference between the QP for the current transform unit and the QP predictor. The QP difference can also be specified at the prediction unit or coding unit. TABLE 1 shows exemplary syntax in a transform unit, in accordance with an embodiment of the present principles.

TABLE 1

| transform_unit( x0, y0, currTransformUnitSize ) { | C | Descriptor |
|---|---|---|
|   if( currTransformUnitSize >   MinTransformUnitSize   &&     currTransformUnitSize <=     MaxTransformUnitSize ) | | |
|     split_transform_unit_flag | 3\|4 | u(1)\|ae(v) |
|   if( split_transform_unit_flag ) {     splitTransformUnitSize = currTransformUnitSize >> 1     x1 = x0 + splitTransformUnitSize     y1 = y0 + splitTransformUnitSize     transform_unit( x0, y0, splitTransformUnitSize) | 3\|4 | |
|     if( x1 < PicWidthInSamples$_L$)       transform_unit( x1, y0, splitTransformUnitSize) | 3\|4 | |
|     if( y1 < PicHeightInSamples$_L$)       transform_unit( x0, y1, splitTransformUnitSize) | 3\|4 | |
|     if( x1 < PicWidthInSamples$_L$ && y1 < PicHeightInSamples$_L$)       transform_unit( x1, y1, splitTransformUnitSize) | 3\|4 | |
|   } else {     coded_block_flag | 3\|4 | u(1)\|ae(v) |
|     if( coded_block_flag ) {       TU_delta_QP | 3\|4 | ae(v) |
|     }     . . .   } } | | |

The semantics of a syntax element TU_delta_QP shown in TABLE 1 is as follows:

TU_delta_QP specifies the value of the QP difference between the QP for the current transform unit ($QP_{TU}$) and the QP predictor ($QP_{PRED}$). The QP for the transform unit ($QP_{TU}$) is derived as $QP_{TU}=QP_{PRED}+TU\_delta\_QP$. TU_delta_QP is only needed when there are non-zero coefficients in the transform unit (i.e., code_block_flag is not zero).

A description will now be given of some of the many attendant advantages/features of the present invention, some of which have been mentioned above. For example, one advantage/feature is an apparatus having a encoder for encoding image data for at least a portion of a picture using a quantization parameter predictor for a current quantization parameter to be applied to the image data, the quantization parameter predictor being determined using multiple quantization parameters from previously coded neighboring portions, wherein a difference between the current quantization parameter and the quantization parameter predictor is encoded for signaling to a corresponding decoder.

Another advantage/feature is the apparatus having the encoder as described above, wherein the quantization parameter predictor is implicitly derived based on a rule that is known to both the encoder and the decoder.

Yet another advantage/feature is the apparatus having the encoder wherein the quantization parameter predictor is implicitly derived based on a rule that is known to both the encoder and the decoder as described above, wherein the rule is for at least one of determining and selecting the quantization parameter predictor responsive to at least one of a quantization parameter having a minimum value from among the multiple quantization parameters, a quantization parameter having a maximum value from among the multiple quantization parameters, a quantization parameter calculated from a median value of at least some of the multiple quantization parameters, and a quantization parameter calculated from a mean value of at least some of the multiple quantization parameters.

Still another advantage/feature is the apparatus having the encoder as described above, wherein the quantization parameter predictor is selected from one or more quantization parameters corresponding to a same portion of the picture as that used for a motion vector prediction, the one or more quantization parameters being among the multiple quantization parameters.

Moreover, another advantage/feature is the apparatus having the encoder wherein the quantization parameter predictor is selected from one or more quantization parameters corresponding to a same portion of the picture as that used for a motion vector prediction, the one or more quantization parameters being among the multiple quantization parameters as described above, wherein a motion vector competition is used to determine the motion vector predictor.

Further, another advantage/feature is the apparatus having the encoder as described above, wherein the image data is one of a coding unit, a prediction unit, and a transform unit.

Also, another advantage/feature is the apparatus having the encoder wherein the image data is one of a coding unit, a prediction unit, and a transform unit as described above, wherein the image data is the prediction unit, and the difference between the current quantization parameter and the quantization parameter predictor is only encoded for signaling to the corresponding decoder when the prediction unit is in a non-skip mode.

Additionally, another advantage/feature is the apparatus having the encoder as described above, wherein the image data is the transform unit, and the difference between the current quantization parameter and the quantization parameter predictor is only encoded for signaling to the corresponding decoder when the transform unit includes non-zero coefficients.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A non-transitory computer readable storage media having video signal data encoded thereupon, comprising:
   image data encoded for at least a portion of a picture using a quantization parameter predictor for a current quantization parameter to be applied to the image data, the quantization parameter predictor being determined using multiple quantization parameters from previously coded neighboring portions, wherein a difference between the current quantization parameter and the quantization parameter predictor is encoded for signaling to a corresponding decoder, and wherein said quantization parameter predictor is determined by finding a mean of the quantization parameters of the previously coded neighboring portion to the left and the previously coded neighboring portion above the portion currently being encoded when these neighboring portions are available, and if at least one of said neighboring portions is not available, basing the quantization parameter predictor on a quantization parameter for a current slice.

2. The non-transitory computer readable storage media of claim 1, wherein the quantization parameter predictor is selected from one or more quantization parameters corresponding to a same portion of the picture as that used for a motion vector prediction, the one or more quantization parameters being among the multiple quantization parameters.

3. The non-transitory computer readable storage media of claim 2, wherein a motion vector competition is used to determine the motion vector predictor.

4. The non-transitory computer readable storage media of claim 1, wherein the image data is a transform unit, and the difference between the current quantization parameter and the quantization parameter predictor is only decoded when the transform unit includes non-zero coefficients.

5. In a video decoder, a method, comprising: decoding image data for at least a portion of a picture using a quantization parameter predictor for a current quantization parameter to be applied to the image data, the quantization parameter predictor being determined using multiple quantization parameters from previously coded neighboring portions; and decoding a difference between the current quantization parameter and the quantization parameter predictor for use in decoding the image data, and wherein said quantization parameter predictor is determined by finding a mean of the quantization parameters of the previously coded neighboring portion to the left and the previously coded neighboring portion above the portion currently being decoded when these neighboring portions are available, and if at least one of said neighboring portions is not available, basing the quantization parameter predictor on a quantization parameter for a current slice.

6. The method of claim 5, wherein the quantization parameter predictor is selected from one or more quantization parameters corresponding to a same portion of the picture as that used for a motion vector prediction, the one or more quantization parameters being among the multiple quantization parameters.

7. The method of claim 6, wherein a motion vector competition is used to determine the motion vector predictor.

8. The method of claim 5, wherein the image data is a transform unit, and the difference between the current quantization parameter and the quantization parameter predictor is only decoded when the transform unit includes non-zero coefficients.

* * * * *